(12) United States Patent  (10) Patent No.: US 8,859,076 B2
Carr et al.  (45) Date of Patent: Oct. 14, 2014

(54) CORNER INSERT FOR SHEET PANEL ASSEMBLY

(75) Inventors: Casey Carr, New Bern, NC (US);
Michael Justis, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 293 days.

(21) Appl. No.: 13/445,961

(22) Filed: Apr. 13, 2012

(65) Prior Publication Data
US 2013/0273303 A1 Oct. 17, 2013

(51) Int. Cl.
*E04C 2/38* (2006.01)

(52) U.S. Cl.
USPC ........................................... 428/120; 428/119

(58) Field of Classification Search
CPC ......... E04C 2/38; E04F 19/065; E04F 19/066
USPC ........... 428/119, 120; 52/287.1, 288.1, 802.1, 52/275
See application file for complete search history.

(56) References Cited

U.S. PATENT DOCUMENTS

| | | |
|---|---|---|
| 2,014,419 A | 9/1935 | Voigt |
| 2,703,159 A | 3/1955 | Van Fleet |
| 3,276,167 A | 10/1966 | Bus et al. |
| 4,320,614 A | 3/1982 | Brezosky |
| 5,297,360 A | 3/1994 | Besore et al. |
| 6,375,284 B1 | 4/2002 | Frank |
| 7,322,770 B2 | 1/2008 | Frank |
| 7,784,238 B2 * | 8/2010 | Bannister ........................ 52/465 |
| 2008/0174218 A1 | 7/2008 | Leimkuehler et al. |

FOREIGN PATENT DOCUMENTS

| | | |
|---|---|---|
| AU | 2004218625 A1 | 4/2005 |
| CN | 2704666 Y | 6/2005 |
| FR | 2429350 A1 | 1/1980 |
| FR | 2556025 A1 | 6/1985 |

OTHER PUBLICATIONS

International Search Report PCT/IB2013/052734 dated Jul. 25, 2013.

* cited by examiner

*Primary Examiner* — Alexander Thomas
(74) *Attorney, Agent, or Firm* — James E. Howard; Andre Pallapies

(57) ABSTRACT

A folded sheet panel assembly includes a gap formed in a corner region which is filled with a corner insert member. A retention clip is attached to the corner insert to retain the corner insert once installed in the gap. The retention clip includes outwardly flaring wing portions which press upon inner surfaces of the sheet panel to fix the installed position of the corner insert. The corner insert includes a locking device which engages a surface of the retention clip to limit or prevent movement of the corner insert relative to the retention clip.

20 Claims, 9 Drawing Sheets

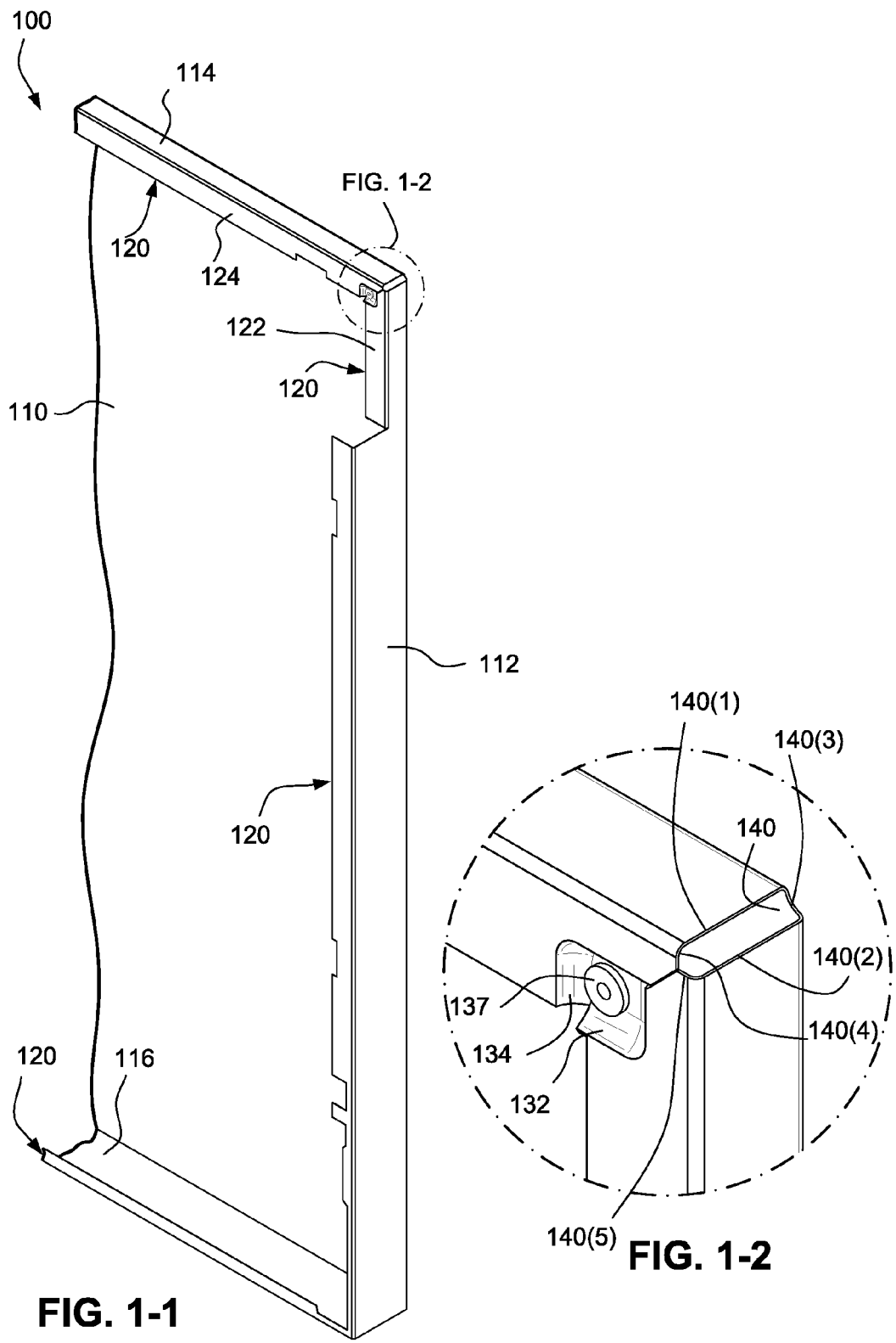

CORNER INSERT FOR SHEET PANEL ASSEMBLY

FIELD OF THE TECHNOLOGY

The present technology relates to a corner insert for a sheet panel assembly, and particularly to a corner insert which eliminates the need to weld the corner of a sheet panel assembly (e.g., a sheet metal assembly).

BACKGROUND OF THE TECHNOLOGY

Sheet panels are used extensively in cabinets for home appliances and office furniture, such as desk drawers and cabinet doors. Typically, the sheet panel is folded to form a double wall construction including an outer wall and a parallel inner wall. This arrangement provides for a corner edge extending between the outer wall and the inner wall.

One method of finishing the corner is to weld the adjoining edges. However, this method is not cost-efficient as the weld area must be polished. Further, a more expensive higher grade of steel may be required (particularly in the case of stainless steel for kitchen appliances) in order to guard against corrosion.

Another method is to simply fold the corner edges leaving a small gap therebetween. There is the potential that a sharp edge may be exposed if a gap remains between the corner edge portions. Further, over time, the gap may tend to grow leading to aesthetic degradation of the panel.

SUMMARY OF THE TECHNOLOGY

One aspect of the disclosed technology is to provide a corner insert which eliminates the need to weld the corner of a sheet panel.

Another aspect of the disclosed technology is to provide a corner insert which provides an aesthetically pleasing contour to a corner region of a sheet panel.

Another aspect of the disclosed technology is to provide a corner insert which covers a corner gap in a sheet panel and has an outer contour which can be changed as desired.

Another aspect of the disclosed technology is to provide a corner insert adapted to be coupled to a retention clip, the retention clip including first and second wings and a cutout portion formed in the retention clip. The corner insert comprises a body portion including an outer surface adapted to cover a gap, a shank extending from the body portion, a wedge portion connected to the shank and including first and second angled wedge surfaces. The first and second wedge surfaces are adapted to engage the wings of the retention clip. A securing member (e.g., a hook) is adapted to cooperate with the cutout portion of the retention clip to couple the corner insert with the retention clip, and at least one locking device is adapted to engage the retention clip to limit movement of the corner insert relative to the retention clip.

Another aspect of the disclosed technology relates to a corner insert assembly which comprises a corner insert configured to be installed in an inserted position within a gap and a retention clip to retain the corner insert in the inserted position. The corner insert comprises a body portion having an outer surface to cover the gap, a shank extending from the body portion, and a wedge portion connected to the shank and including first and second angled wedge surfaces. The retention clip has a cutout formed therein, the cutout being at least partially delimited by at least one edge, wherein the corner insert includes at least one locking device, and the locking device includes a pressing surface configured to engage the at least one edge of the retention clip to limit movement of the corner insert relative to the retention clip.

Another aspect of the disclosed technology relates to a panel assembly which comprises a panel comprising an outer wall, an inner wall spaced from the outer wall, a side wall substantially perpendicular to the outer wall and extending between the outer wall and the inner wall, and an upper wall substantially perpendicular to the outer wall and extending between the outer wall and the inner wall, wherein the outer wall, the inner wall, the side wall and the upper wall include edge portions which delimit a gap at a corner of the panel. A corner insert is configured to be installed in an inserted position within the gap, wherein the corner insert has a body portion having an outer surface to cover the gap and a retention clip to retain the corner insert in the inserted position. The retention clip has a cutout formed therein, wherein the cutout is at least partially delimited by at least one edge. The corner insert includes at least one locking device, wherein the locking device includes a pressing surface configured to engage the at least one edge of the retention clip to limit movement of the corner insert relative to the retention clip.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of this technology. In such drawings:

FIG. 1-1 is a partial perspective view of a panel assembly with the corner insert removed according to an example of the disclosed technology;

FIG. 1-2 is an enlarged detail taken from FIG. 1-1;

FIG. 2-1 is a partial perspective view of a panel assembly with the corner insert installed according to an example of the disclosed technology;

FIG. 2-2 is an enlarged detail taken from FIG. 2-1;

FIG. 2-3 is an enlarged side view of the panel assembly of FIG. 2-1 with the corner insert installed;

FIGS. 3-1 to 3-4 show a process of assembling the corner insert and the retention clip according to an example of the disclosed technology;

FIG. 3-5 is a side view of the corner insert and retention assembly of FIG. 3-4;

FIGS. 4-1 is a partial perspective view of the panel with a cutaway portion showing a process of installing the corner insert assembly in the panel according to an example of the disclosed technology;

FIG. 4-2 is a side view of the panel showing a process of installing the corner insert assembly according to an example of the disclosed technology;

FIG. 4-3 is a partial perspective views of the panel with a cutaway portion showing a process of installing the corner insert assembly in the panel according to an example of the disclosed technology;

FIG. 5 is a cross-sectional view along the line 5-5 of FIG. 2-2;

FIG. 6-1 is a side view of the corner insert of FIG. 3-1;
FIG. 6-2 is a top view of the corner insert of FIG. 3-1;
FIG. 6-3 is a side view of the corner insert of FIG. 3-1;
FIG. 7-1 is a cross-sectional view along the line 7-1-7-1 in FIG. 7-3;
FIG. 7-2 is a front view of the retention clip of FIG. 3-1; and
FIG. 7-3 is a top view of the retention clip of FIG. 3-1.

DETAILED DESCRIPTION OF ILLUSTRATED EXAMPLES

The following description is provided in relation to several examples which may share common characteristics and features. It is to be understood that one or more features of any one example may be combinable with one or more features of the other examples. In addition, any single feature or combination of features in any of the examples may constitute additional examples.

Figures 1, 2:
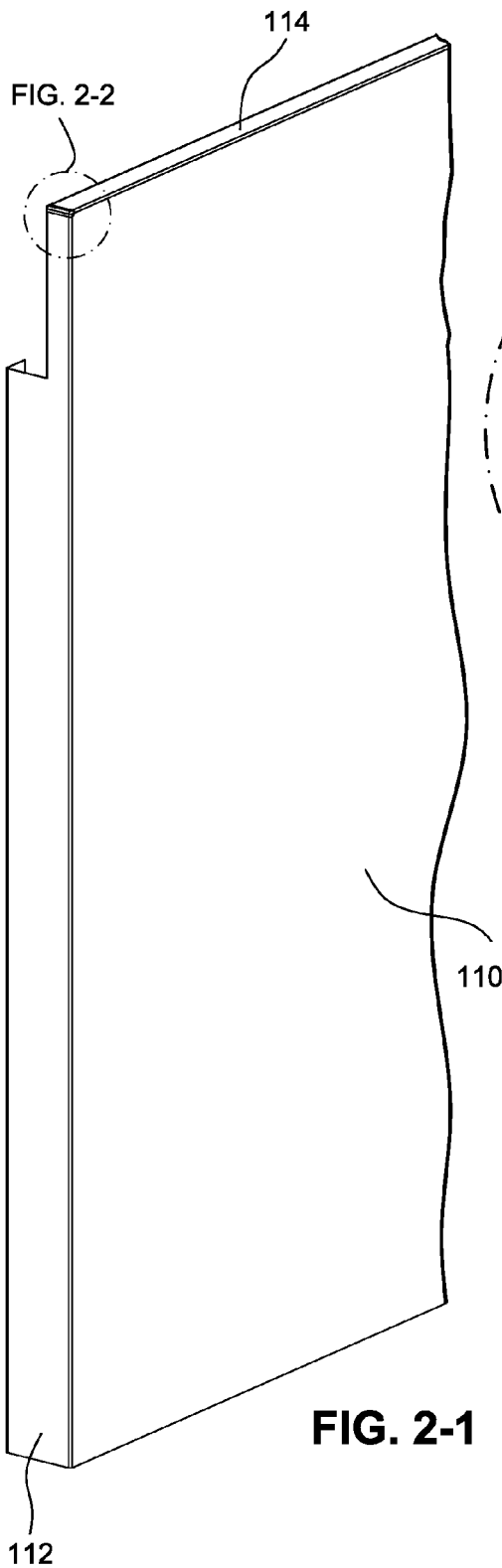
Figure 2:
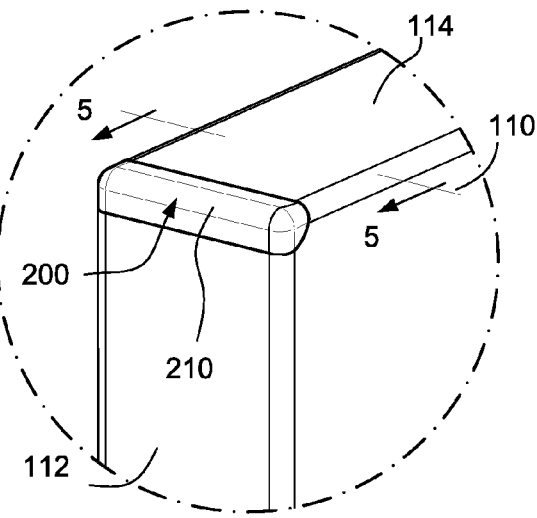

FIG. 1-1 illustrates a folded sheet panel according to an example of the disclosed technology. In the illustrated example, the sheet panel 100 is made of metal although the panel could be formed from other materials. The sheet panel 100 is folded into a double wall construction including an outer wall 110 and an inner wall 120 substantially parallel to the outer wall. A gap 140 is formed in a corner section of the sheet panel. The sheet panel also includes a pair of side walls 112 (only one is shown), an upper wall 114 and a bottom wall 116 all of which extend between the outer wall 110 and the inner wall 120. It is noted that the inner wall 120 may be discontinuous, as shown in FIG. 1-1, where some portions of the inner wall 120 are closer to the outer wall 110 than other portions of the inner wall. For instance, in the upper corner area of the sheet panel 100 shown in FIG. 1-1, the inner wall 120 forms a side inner wall portion 122 and an upper inner wall portion 124. The side inner wall portion 122 and the upper inner wall portion 124 each include recessed flanges 132, 134 which are connected to one another by a connector (e.g. a rivet) 137 to fix the folded arrangement of sheet panel 100.

As shown in FIG. 1-2, the gap 140 includes a plurality of edge portions 140(1), 140(2), 140(3), 140(4) and 140(5) formed by the outer wall 110, the side wall 112, the upper wall 114, the side inner wall portion 122, and the upper inner wall portion 124. The edge portions may be designed to form any suitable shape as long as the shape corresponds to the corner insert which fills the gap. In the illustrated example, the edge portion 140(1) is a substantially linear portion corresponding to the upper wall 114. Likewise, the edge portion 140(2) is a substantially linear portion corresponding to the side wall 112. The edge portion 140(3) corresponds to the outer wall 110 and includes a curved transition which connects to the edge portion 140(1) and a curved transition which connects to the edge portion 140(2). The edge portion 140(4) corresponds to the upper inner wall portion 124 and is substantially linear with a curved transition which connects to the edge portion 140(1). Similarly, the edge portion 140(5) corresponds to the side inner wall portion 122 and is substantially linear with a curved transition which connects to the edge portion 140(2). The edge portion 140(4) is substantially perpendicular to the edge portion 140(5), whereas the edge portion 140(3) on the other side of the gap 140 forms a generally continuous curvature (as is more clearly seen in FIG. 2-2).

Figures 2, 3:
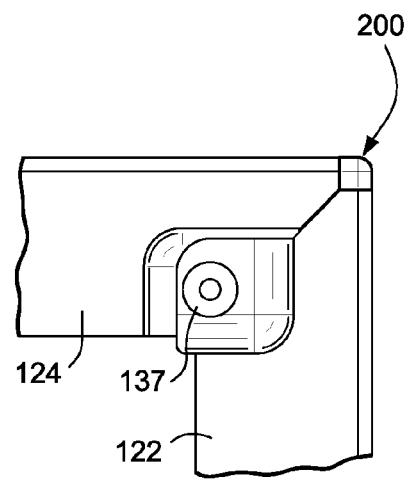

The gap 140 is filled with a corner insert 200 to provide smooth transitions in the corner section of the sheet panel 100, as shown in FIGS. 2-1 to 2-3 and described in detail later. The sheet panel 100 may be formed or otherwise configured for use in any number of applications. For instance, the sheet panel may form part of a cabinet for a home appliance, office furniture, or form any other sheet panel structure. In the illustrated example, the sheet panel forms a dishwasher door and is constructed of sheet metal. The corner insert 200 is not limited to use in sheet panel assemblies and may be used to cover gaps formed in other structures.

The corner insert 200 is coupled to a retention clip 300 before installation in the gap 140. The retention clip 300 functions to lock the position of the corner insert 200 once installed in the gap 140 by deforming to fit within the gap and then pressing upon the inner surfaces of the sheet panel as the retention clip 300 returns to its original shape. The corner insert 200 may be formed of a thermoplastic, e.g., ABS, however it is possible that other materials may be used. The retention clip is made of spring steel; however, other materials may be used provided they are sufficiently elastic.

Figures 1, 3:
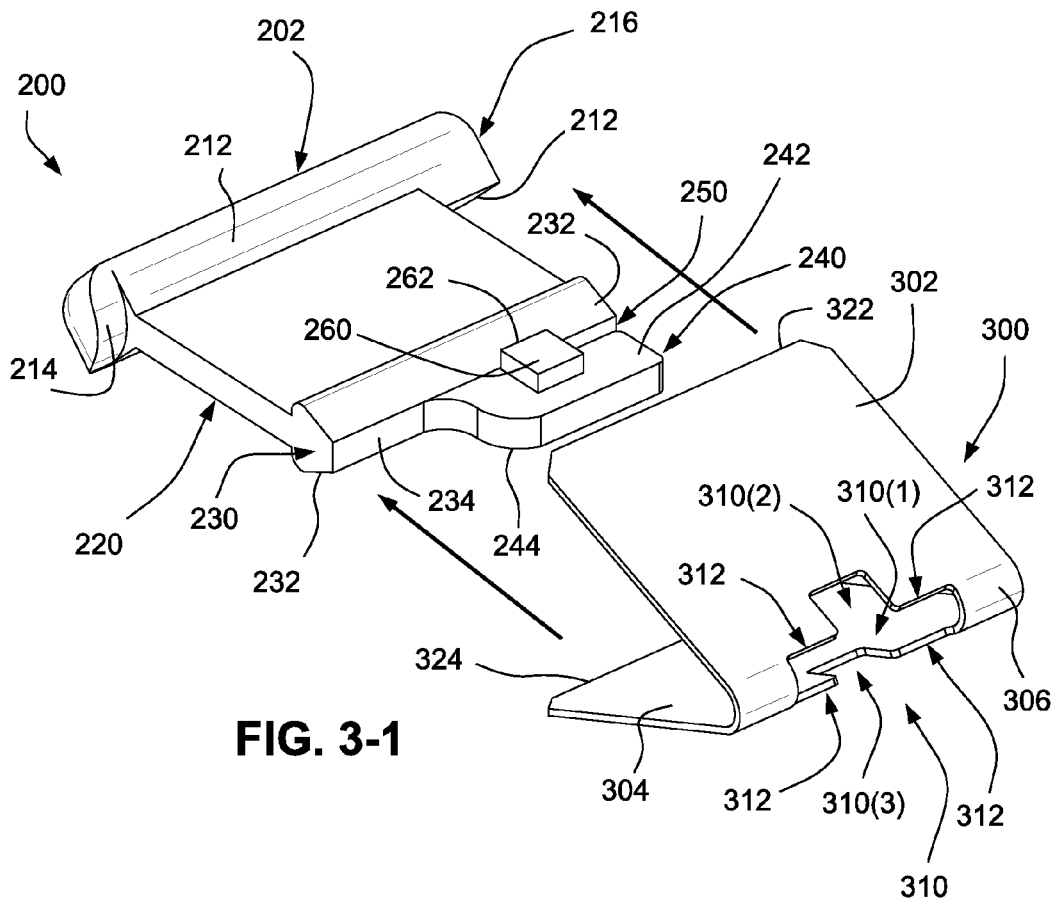
Figures 2, 3:
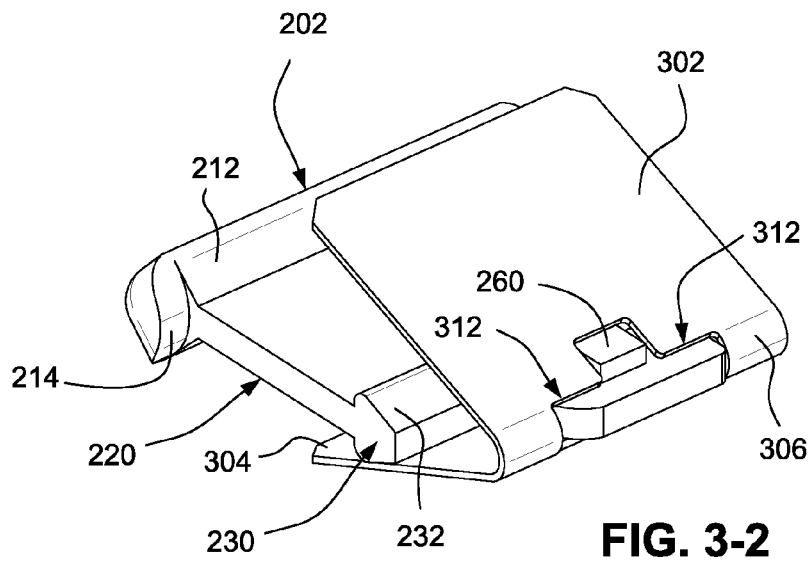
Figure 3:
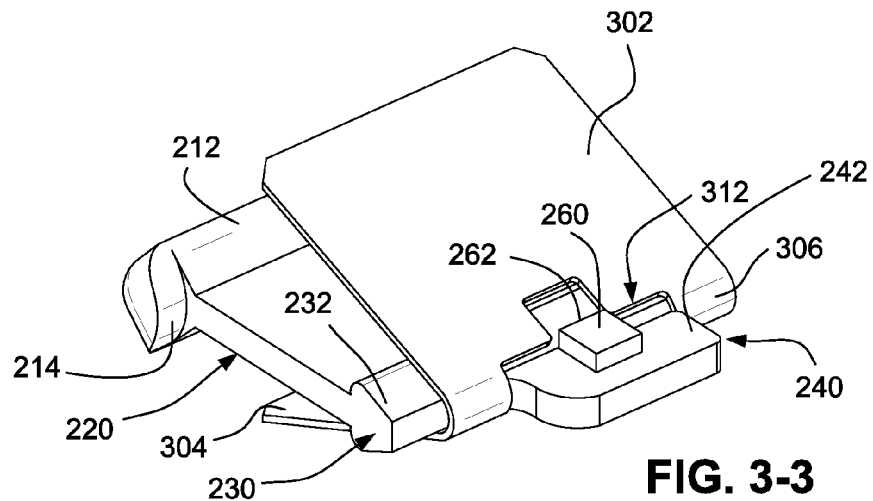
Figures 3, 4:
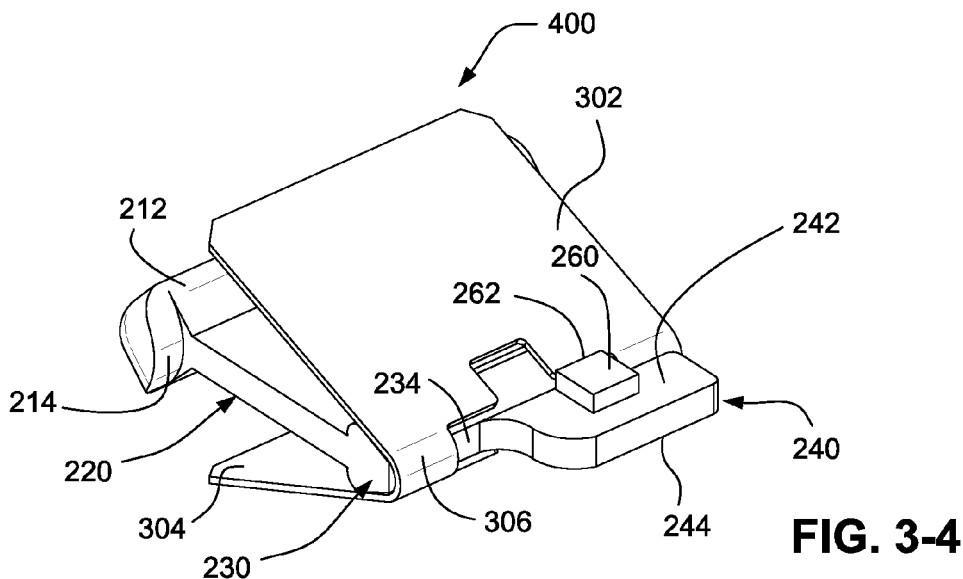
Figures 1, 6:
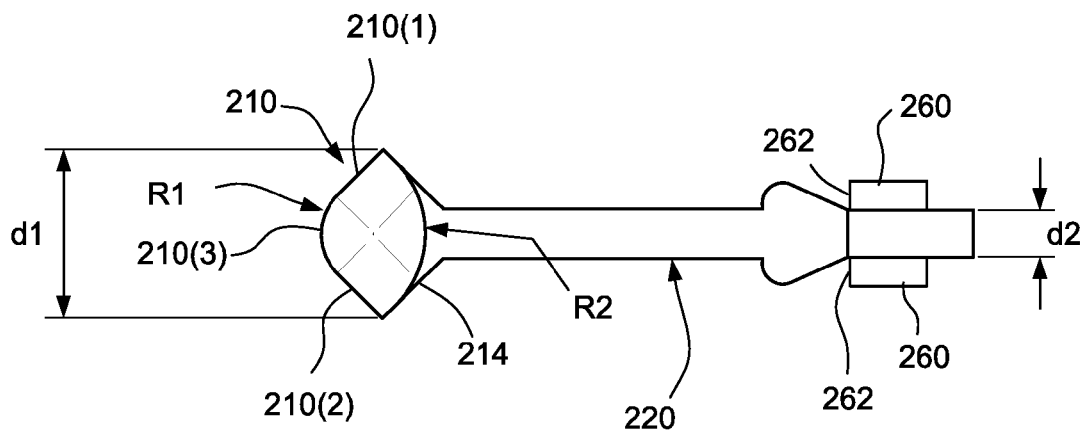
Figures 2, 6:
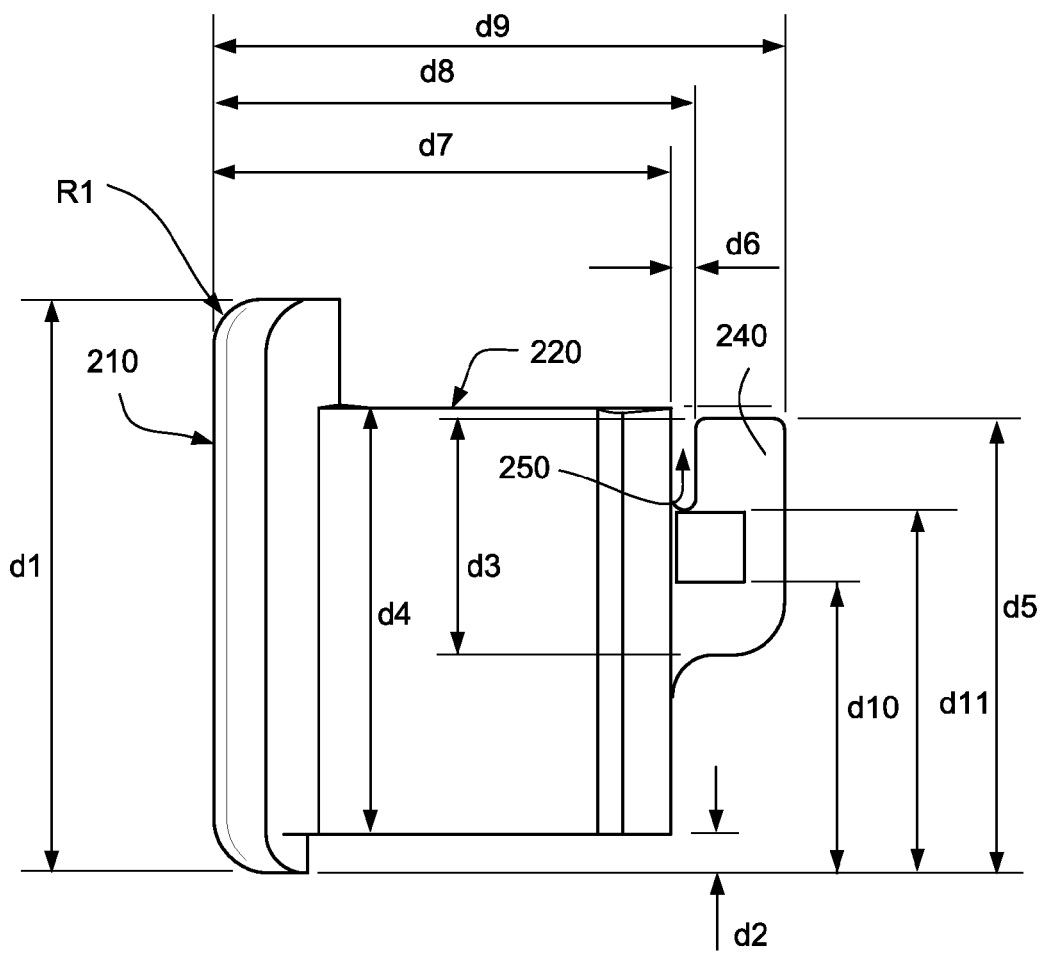
Figures 3, 6:
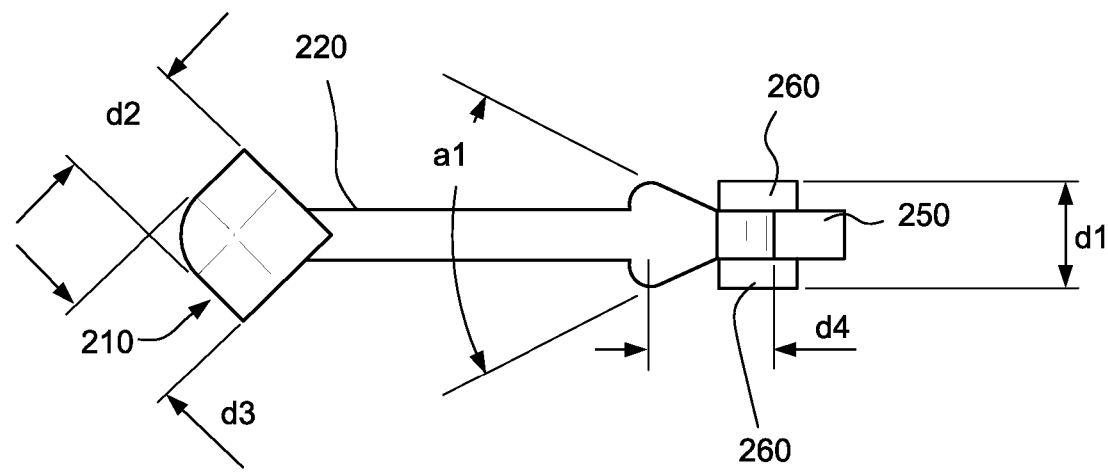

Once assembled, the corner insert 200 and the retention clip 300 form a corner insert assembly 400, as shown in FIG. 3-4. Referring to FIGS. 3-1 to 3-4, a process of assembling the corner insert 200 and the retention clip 300 is shown. The corner insert 200 includes a body portion 202, a shank 220 projecting from the body portion and a wedge 230 formed at a distal end of the shank 220. The body portion 202 forms an exterior cover surface 210 which covers the gap 140. The cover surface 210 includes a first portion 210(1) and a second portion 210(2) which are substantially linear and a curved central portion 210(3) therebetween, as best seen in FIGS. 2-2 and 6-1. The body portion 202 further includes inner walls 212 which extend from the cover surface 210 to the shank 220. A shoulder 214 conforming to the contour of the edge portion 140(3) is formed at one end of the body portion 202 and engages the edge portion 140(3) when the corner insert is installed. At the other end of the body portion 202, the inner walls form an engaging portion 216 which conforms to the contour of the edge portions 140(4), 140(5) such that the engaging portion 216 engages the edge portions 140(4), 140(5) when the corner insert 200 is installed.

The wedge 230 includes angled opposing wedge surfaces 232 and a truncated nose portion 234. A securing member (e.g., a hook) 240 extends from the truncated nose 234 and has a portion separated from the truncated nose by a slot 250. The securing member 240 has top and bottom surfaces 242, 244 each having a locking device 260 installed thereon. In the illustrated example, the locking device 260 is formed as a square member, however, other shapes or configurations may be used (e.g., trapezoidal, triangular, rectangular). The locking device 260 includes a pressing surface 262 extending along the side of the locking device which is adjacent the wedge surface 232. The pressing surface 262 is configured to engage a portion of the retention clip 300 to aid in securing the retention clip to the corner insert 200 and limiting or preventing relative movement between the retention clip 300 and the corner insert, as will be described in detail later.

Figures 1, 7:
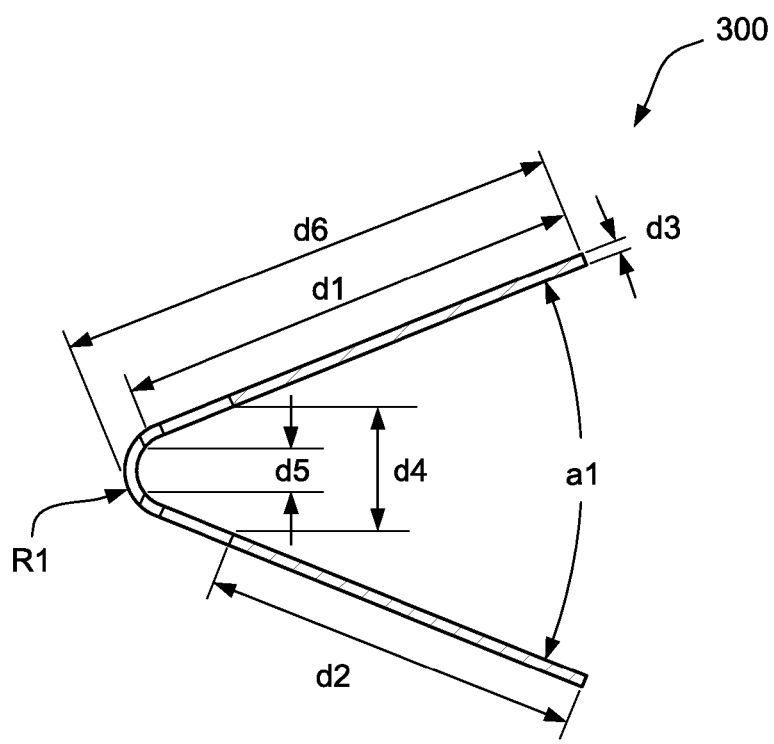
Figures 2, 7:
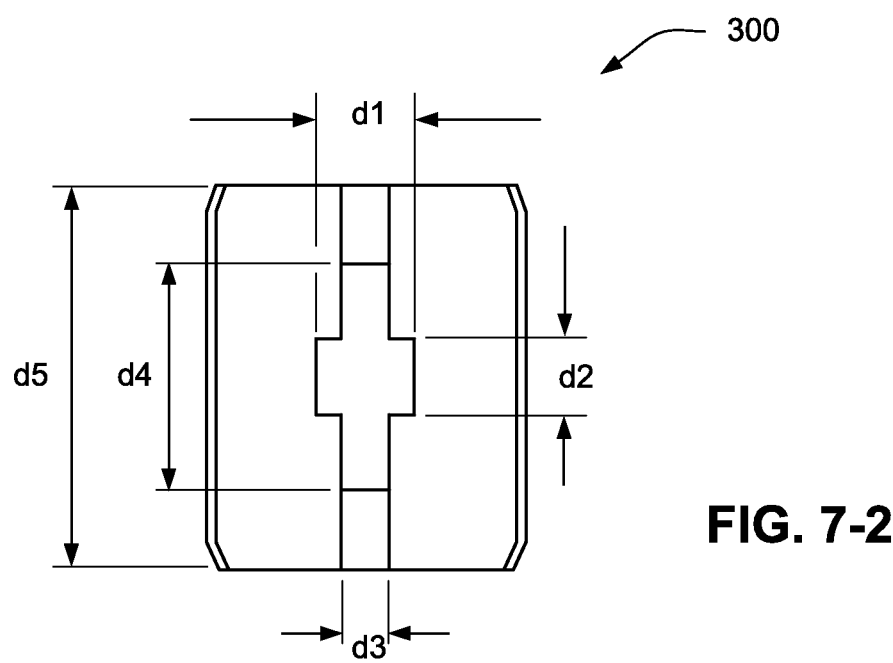
Figures 3, 7:
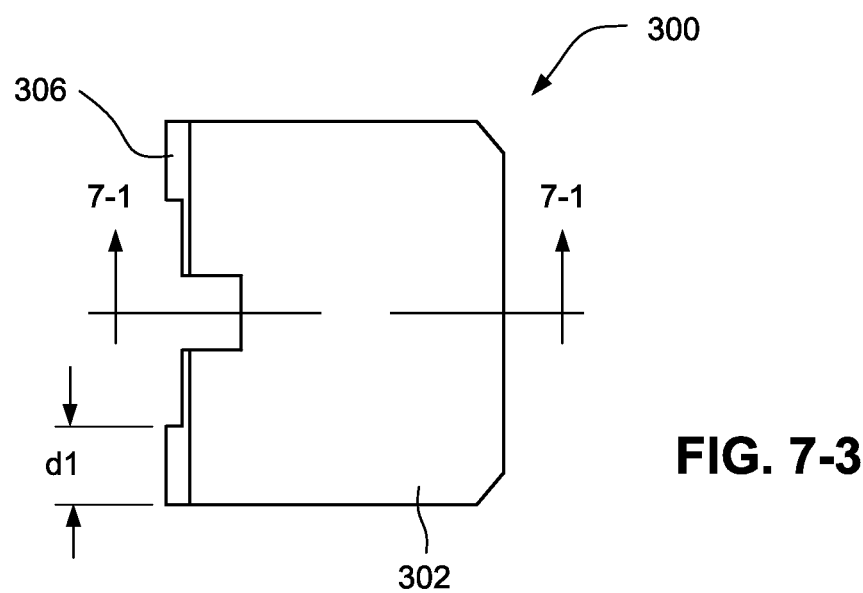

Still referring to FIGS. 3-1 to 3-4, the retention clip has a substantially V shape, including a first wing 302, a second wing 304 and a nose 306. A cutout 310 is formed in the retention clip 300 for receiving the securing member 240 and the locking devices 260. The cutout 310 includes a central portion 310(1) formed in the nose 306 of the retention clip and two side portions 310(2), 310(3) extending respectively from the central portion 310(1) into a middle section of the wings 302, 304. In plan view, the cutout 310 forms the shape of a cruciform, as shown in FIG. 7-3. The cutout is arranged symmetrically within the retention clip 300 such that the retention clip may be coupled with the cover insert 200 when oriented as shown in FIG. 3-1 or even if flipped upside down. In other words, the retention clip has no fixed top or bottom. This arrangement provides ease of assembly as a user may simply insert the cover insert 200 into the retention clip regardless of a top/bottom orientation of the retention clip 300.

The central portion 310(1) is sized to accommodate the securing member 240 while the side portions 310(2), 310(3) of the cutout are arranged to accommodate the locking devices 260, as shown in FIG. 3-2. The cutout 310 forms a plurality of engaging edges 312 configured to engage the pressing surface 262 of the locking device 260. The engaging edges 312 correspond to edge portions formed by the central portion 310(1) of the cutout. A total of four engaging edges 312 are formed, including two engaging edges 312 adjacent the wing 302 and separated by the side portion cutout 310(2) and two engaging edges 312 adjacent the wing 304 and separated by the side portion cutout 310(3).

The first wing 302 has a retaining edge 322 formed along an edge of the first wing 302 opposite the side of the first wing adjacent the nose 306. Likewise, the second wing 304 has a retaining edge 324 formed along an edge of the second wing 304 opposite the side of the second wing adjacent the nose 306. After the corner insert 200 and retention clip 300 are installed in the gap 140, the retaining edges 322, 324 press against inner surfaces of the sheet panel 100 to fix the position of the corner insert assembly 400. The corners of the retaining edges 322, 324 may be chamfered, as shown in FIGS. 3-1 to 3-4.

Figures 3, 4, 5:
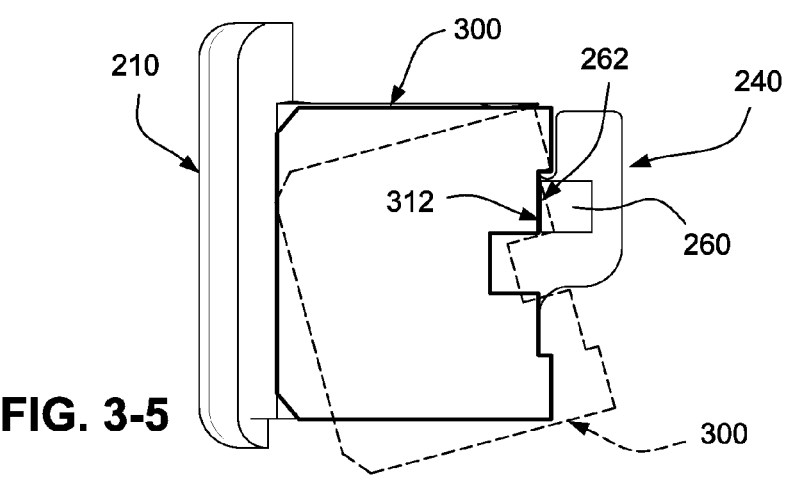
Figures 1, 4:
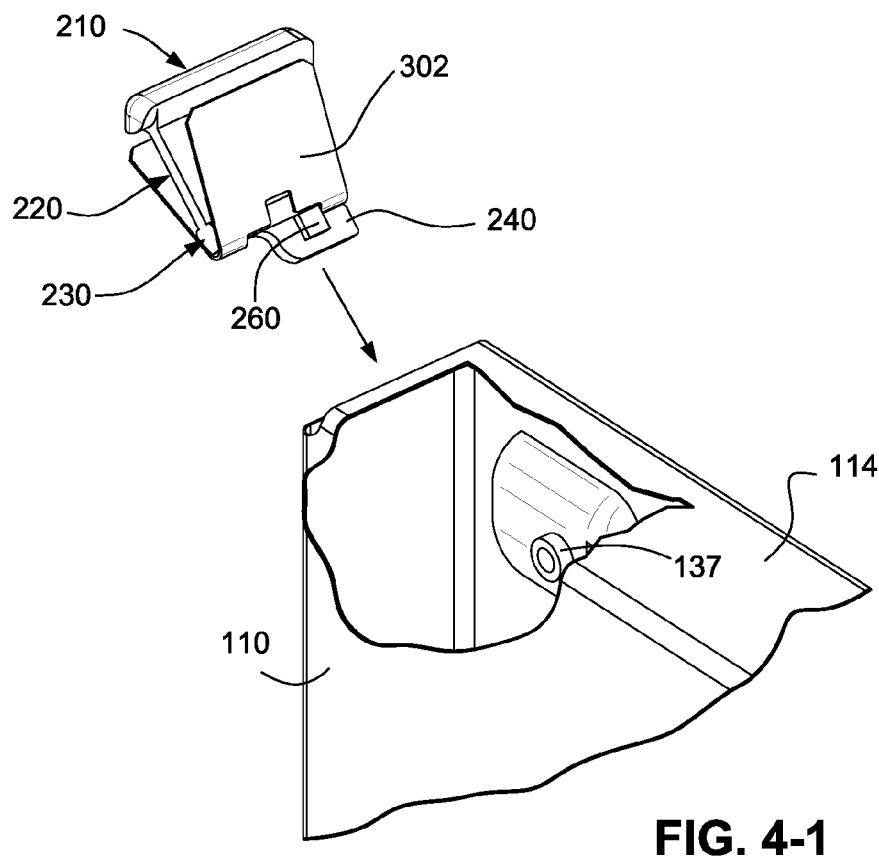
Figures 2, 4:
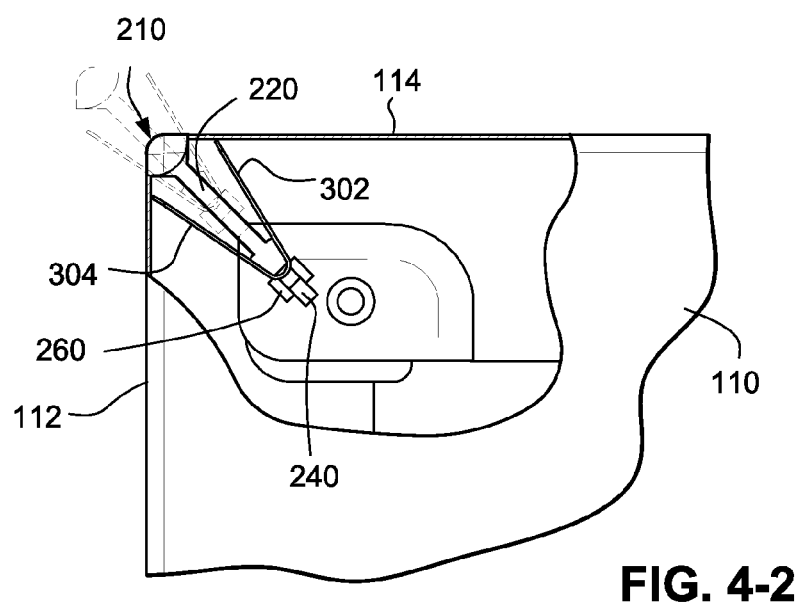
Figures 3, 4:
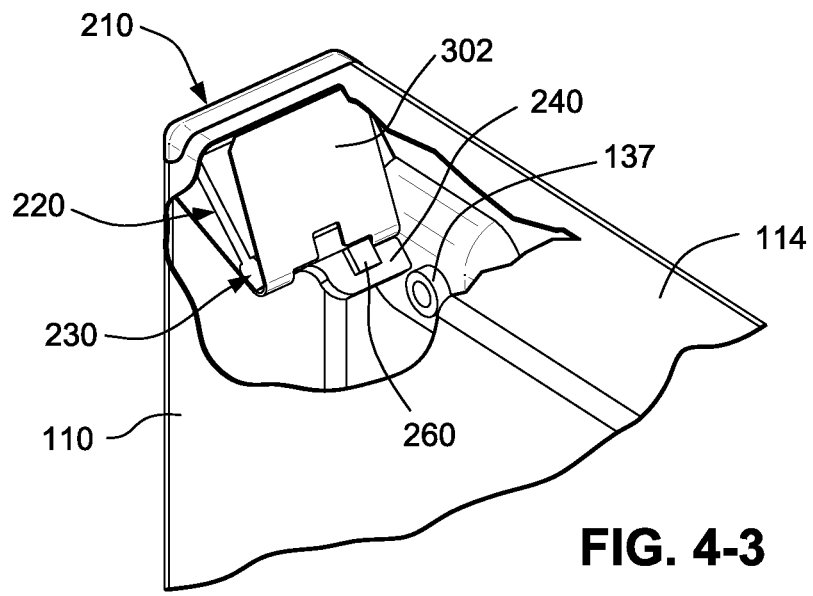
Figure 5:
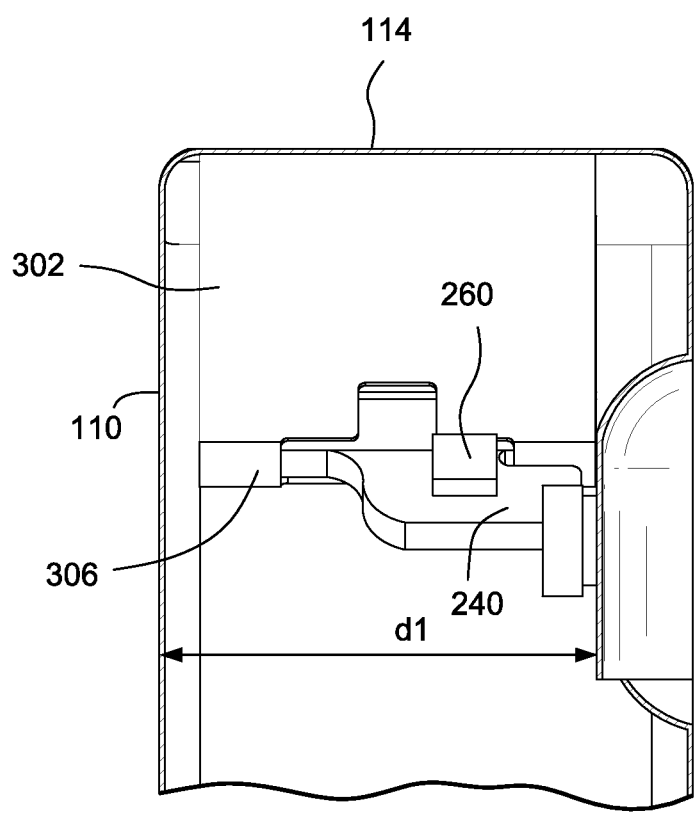

As shown in FIGS. 3-2 and 3-3, to couple the corner insert 200 and the retention clip 300, the securing member 240 and the locking devices 260 are inserted through the cutout 310. Then, the retention clip 300 is shifted or slid laterally with respect to the corner insert 200 such that the nose 306 is received in the slot 250. In this position, shown in FIG. 3-4, the pressing surfaces 262 of the locking devices 260 press upon the engaging edges 312 to fix the retention clip 300 on the corner insert 200. The locking devices 260 serve to lock the positioning of the corner insert relative to the retention clip, and further prevent the retention clip from being pulled away from the corner insert, tilting or rotating with respect to the corner insert, as shown in FIG. 3-5. The rotating motion may be described as rotation about an axis in FIG. 3-5 extending into the page at a point along the nose 306 of the retention clip The wedge surfaces 232 are angled to cause the wings 302, 304 to extend at a particular angle with respect to one another. In the illustrated example, the wedge surfaces 232 have an angle that is similar to the angle formed by the wings 302, 304. However, after repeated use, in which the wings 302, 304 are deformed (or moved closer to each other) in order to fit within the gap 140, the wings 302, 304 may not recover to their original position (the angle they originally formed). Thus, the wedge surfaces 232 will cause the wings 302, 304 to always extend at least at an angle corresponding to the angle of the wedge surfaces 232.

The cover insert assembly 400 is inserted into the gap 140, as shown in FIGS. 4-1 to 4-3 and 5. As the cover insert assembly 400 is being inserted into the gap, the wings 302, 304 are deformed (or moved closer to each other) so that they can be inserted into the gap 140. The deformed wings 302, 304 are forced to abut the wedge surfaces 232. The wedge surfaces 232 exert a force upon the deformed wings 302, 304 which acts to spread the wings apart so as to cause to wings to form an angle corresponding to the angle formed by the wedge surfaces. Thus, once the wings 302, 304 clear the gap 140, the wedge surfaces 232 force the wings open such that the retaining edges 322, 324 press upon the inner surfaces of the side wall 112 and the upper wall 114. Since the wings are still in a deformed position, engagement of the wedge surfaces with the wings 302, 304 further locks the relative positioning of the corner insert and the retention clip, as the wings 302, 304 are forced to clamp the wedge surfaces 232. The force exerted against the side wall 112 and the upper wall 114 by the retention clip 300 fixes the corner insert assembly 400 in place and prevents inadvertent removal of the assembly 400.

As shown in FIGS. 2-2 and 4-3, the cover surface 210 provides a smooth transition between the outer wall 110, the side wall 112, the upper wall 114, the side inner wall portion 122 and the upper inner wall portion 124. It is noted that the cover surface 210 may be configured to have any desired contour.

Referring to FIG. 6-1, in an example, d1 may be about 4.90-5.14 mm, e.g. 5.02 mm, d2 may be about 1.2-1.8 mm, e.g., 1.5 mm, the radius of curvature R1 may be about 1.55-1.95 mm, e.g., 1.75 mm, and the radius of curvature R2 may be about 2.55-2.95 mm, e.g., 2.75 mm Referring to FIG. 6-2, in an example, d1 may be about 19.06-19.86 mm, e.g., 19.46 mm, d2 may be about 1.16-1.56 mm, e.g., 1.36 mm, d3 may be about 7.7-8.3 mm, e.g., 8.0 mm, d4 may be about 14.15-14.75 mm, e.g., 14.45 mm, d5 may be about 15.11-15.71 mm, e.g., 15.41 mm, d6 may be about 0.6-1.0 mm, e.g., 0.8 mm, d7 may be about 15.25-16.05 mm, e.g., 15.65 mm, d8 may be about 15.93-16-73 mm, e.g., 16.33 mm, d9 may be about 18.93-19.73, e.g., 19.33 mm, d10 may be about 9.6-10.2 mm, e.g., 9.9 mm, d11 may be about 12.11-12.71 mm, e.g., 12.41 mm, and the radius of curvature R1 may be about 1.55-1.95 mm, e.g., 1.75 mm Referring to FIG. 6-3, in an example, d1 may be about 2.8-3.2 mm, e.g., 3.0 mm, d2 may be about 3.25-3.85 mm, e.g., 3.55 mm, d3 may be about 3.25-3.85 mm, e.g., 3.55 mm, d4 may be about 2.51-2.91 mm, e.g., 2.71 mm, and the angle a1 may be about 43-47°, e.g., 45°.

Referring to FIG. 7-1, in an example, d1 may be about 12.55-12.95 mm, e.g., 12.75 mm, d2 may be about 10.19-10.59 mm, e.g., 10.39 mm, d3 may be about 0.25-0.35 mm, e.g., 0.3 mm, d4 may be about 3.2-3.8 mm, e.g., 3.5 mm, d5 may be about 1.5-1.9 mm, e.g., 1.7 mm, d6 may be about 13.48-14.28 mm, e.g., 13.88 mm, the radius of curvature R1 may be about 1.1-1.5 mm, e.g., 1.3 mm, and the angle a1 may be about 42-48°, e.g., 44°.

Referring to FIG. 7-2, in an example, d1 may be about 3.2-3.8 mm, e.g., 3.5 mm, d2 may be about 2.6-3.0 mm, e.g., 2.8 mm, d3 may be about 1.5-1.9 mm, e.g., 1.7 mm, and d4 may be about 8.1-8.9 mm, e.g., 8.5 mm Referring to FIG. 7-3, in an example, d1 may be about 2.78-3.18 mm, e.g., 2.98 mm.

Further, referring to FIG. 5, in an example, d1 may be about 15.55-16.35 mm, e.g., 15.95 mm While the technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the disclosure.

What is claimed is:

1. A corner insert adapted to be coupled to a retention clip, the retention clip including first and second wings and a cutout portion formed in the retention clip, the corner insert comprising:
   a body portion including an outer surface adapted to cover a gap;
   a shank extending from the body portion;
   a wedge portion connected to the shank and including first and second angled wedge surfaces and a nose portion, the first and second wedge surfaces being separated by the nose portion and adapted to engage the wings of the retention clip, the nose portion forming an end face of the wedge portion;

a securing member extending from the nose portion and adapted to cooperate with the cutout portion of the retention clip to couple the corner insert with the retention clip; and at least one locking device adapted to engage the retention clip to limit movement of the corner insert relative to the retention clip, wherein the securing member includes a slot separating a first portion of the securing member from the end face of the wedge portion such that a surface of the first portion of the securing member opposes the end face of the wedge portion.

2. The corner insert according to claim 1, wherein the securing member is a hook adapted to receive retention clip.

3. The corner insert according to claim 1, wherein the body portion includes a shoulder having a contour adapted to conform to a shape of the gap.

4. The corner insert according to claim 1, wherein the locking device forms a raised portion on a surface of the securing member.

5. The corner insert according to claim 1, wherein the at least one locking device includes two locking devices on opposite surfaces of the securing member.

6. A corner insert assembly, comprising:
a retention clip; and
the corner insert of claim 1, the corner insert being configured to be installed in an inserted position within a gap,
wherein the retention clip is configured to retain the corner insert in the inserted position, the retention clip having a cutout formed therein, the cutout being at least partially delimited by at least one edge, and
wherein the at least one locking device of the corner insert includes a pressing surface configured to engage the at least one edge of the retention clip to limit movement of the corner insert relative to the retention clip.

7. The corner insert assembly according to claim 6, wherein the at least one locking device includes two locking devices on opposite sides of corner insert.

8. The corner insert assembly according to claim 7, wherein the two locking devices are disposed on opposite sides of the securing member.

9. The corner insert assembly according to claim 8, wherein the securing member forms a hook.

10. The corner insert assembly according to claim 6, wherein the retention clip includes a first wing and a second wing oriented to form an angle with respect to one another, and the wedge of the corner insert is positioned between the first wing and the second wing.

11. The corner insert assembly according to claim 10, wherein the first and second wedge surfaces are configured to exert a force upon the first and second wings to retain the corner insert in the inserted position.

12. A panel assembly, comprising:
a panel having a gap formed at a corner thereof; and
the corner insert of claim 1, the corner insert being installed in an inserted position within the gap.

13. The panel assembly of claim 12, wherein the panel further comprises:
an outer wall;
an inner wall spaced from the outer wall;
a side wall substantially perpendicular to the outer wall and extending between the outer wall and the inner wall; and
an upper wall substantially perpendicular to the outer wall and extending between the outer wall and the inner wall,
wherein the outer wall, the inner wall, the side wall and the upper wall include edge portions which delimit the gap formed at the corner of the panel.

14. The panel assembly of claim 13, further comprising a retention clip to retain the corner insert in the inserted position, the retention clip having a cutout formed therein, the cutout being at least partially delimited by at least one edge,
wherein the at least one locking device of the corner insert includes a pressing surface configured to engage the at least one edge of the retention clip to limit movement of the corner insert relative to the retention clip.

15. The panel assembly of claim 14, wherein the retention clip includes first and second wings configured to respectively engage inner surfaces of the side wall and the upper wall to secure the corner insert in the gap.

16. The panel assembly of claim 15, wherein the first and second angled wedge surfaces exert a force upon the first and second wings to cause the first and second wings to engage the inner surfaces of the side wall and the upper wall.

17. The panel assembly of claim 13, wherein the side wall includes an inner side wall portion and an upper side wall portion, a first edge portion of the upper inner side wall portion and a second edge portion of the side inner wall portion are arranged substantially perpendicularly, and the body portion of the corner insert has an engaging portion at a first end thereof having a contour which conforms to a contour of the first and second edge portions.

18. The panel assembly of claim 17, wherein the edge portion of the outer wall forms a curvature, and the body portion of the corner insert has a shoulder at a second end thereof having a contour which conforms to the curvature of the edge portion of the outer wall.

19. The panel assembly of claim 12, wherein the at least one locking device includes two locking devices disposed respectively on opposite sides of corner insert.

20. The panel assembly of claim 12, wherein the panel is a dishwasher door.

* * * * *